United States Patent [19]

Wloka

[11] 4,363,631
[45] Dec. 14, 1982

[54] STRUCTURAL ARRANGEMENT FOR OXIDE CERAMIC SHAFTS

[75] Inventor: Gert Wloka, Ostfildern, Fed. Rep. of Germany

[73] Assignee: Feldmühle Aktiengesellschaft, Dusseldorf, Fed. Rep. of Germany

[21] Appl. No.: 156,330

[22] Filed: Jun. 4, 1980

[30] Foreign Application Priority Data

Jun. 7, 1979 [DE] Fed. Rep. of Germany ....... 2923075

[51] Int. Cl.³ .............................................. F16C 3/00
[52] U.S. Cl. .................................. 464/181; 464/183; 464/903; 415/214
[58] Field of Search ...................... 64/1 R, 1 S, 1 C, 4; 415/214; 464/179, 187, 182, 183, 903

[56] References Cited

U.S. PATENT DOCUMENTS

| | | | |
|---|---|---|---|
| 1,802,695 | 4/1931 | Bennett | 64/1 S |
| 2,239,228 | 4/1941 | Hankison | 415/214 |
| 2,601,146 | 6/1952 | Ivanoff | 64/1 S |
| 2,890,575 | 6/1959 | Seifert | 64/1 S |
| 2,963,979 | 12/1960 | Eisenmann et al. | 415/214 |
| 3,459,133 | 8/1969 | Scheffler | 415/214 |
| 3,801,226 | 4/1974 | Bevan et al. | 415/214 |
| 3,819,293 | 6/1974 | Litzmann | 415/214 |
| 4,063,850 | 12/1977 | Hueber et al. | 415/214 |

*Primary Examiner*—Ira S. Lazarus
*Attorney, Agent, or Firm*—Toren, McGeady & Stanger

[57] ABSTRACT

The shaft of a glandless pump which is made of sintered oxide ceramics in order to resist chemical attack is formed with a projection upon which there is mounted a metal sleeve having a bottom in order to enable a tool, such as a screwdriver, to be applied against the shaft for rotating the shaft when unblocking the pump without causing damage to the ceramic material of the shaft.

4 Claims, 2 Drawing Figures

STRUCTURAL ARRANGEMENT FOR OXIDE CERAMIC SHAFTS

The present invention relates generally to the structure of a shaft made of oxide ceramic materials and more particularly to an oxide ceramic shaft for glandless pumps particularly circulation pumps of the type used for heating installations.

Glandless pumps operate in a housing which is enclosed in itself wherein the pumping medium is also the lubricating medium for the bearings of the pump shaft. Liquid pumps of this type are generally equipped with a canned motor or slotted tube motor. The motor is also cooled by the pump medium and the motor bearing is also the bearing of the pump shaft inasmuch as the rotor of the pump and the motor are arranged on the same shaft.

Since in many cases a multitude of available pumping media cannot be maintained absolutely clean and since they will readily become contaminated with traces of sand, scaled-off deposits of lime, rust from a pipe system and the like, consideration must be given in the engineering design of the pumps to the urgent need for provision of a shaft and bearing combination which will withstand not only mechanical loads but also chemical attack from foreign matter in the pumping medium.

A prior art solution to this task is provided in German Offenlegungsschrift No. 15 28 640 wherein the shafts and the bearings of a circulation pump for heating installation are formed to consist of sintered oxide ceramics.

Instead of a solid construction of the pump shaft formed of the sintered oxide ceramic materials, it is possible to insert bearing journals on both sides in a hollow steel shaft or to glue appropriate corrugated ceramic sleeves onto a steel shaft.

Due to the fact that two equally hard materials run upon each other, great wear will not occur either in the friction bearings or in the corresponding shafts. Thus, this solution has promised to provide an excellent expedient for a problem which had existed for a long period of time.

However, new problems arise inasmuch as, circulating pumps for heating installations are switched off during summer months. Thus, the pumps will lie idle for long periods of time. During the idle period of these pumps, significant amounts of foreign matter will frequently accumulate in the rotor chamber of the pump so that the pump will become blocked and will not start under its own power even after current supply has been switched on.

Incidentally, although in the following description, the invention is discussed with reference to such circulation pumps, it should be understood that the invention is not to be limited to such pumps.

Pumps of the conventional type which are provided with steel shafts and which generally run in bronze bearings are normally provided with a slot on the end face of the shaft with the slot being accessible from outside so that the pump may be manually unblocked, for example, by insertion of a screwdriver in the slot in order to enable turning or rotation of the shaft by the screwdriver. Such a design however cannot be used in shafts made of sintered oxide ceramics because the ceramic material is too sensitive to the stresses which will result and in many cases the pump will not be unblocked by turning of the screwdriver but instead the pump shaft which is generally relatively narrow will break in the region of the bearings. This breaking not only results in damage to the pump shaft, but after a short amount of running time the bearing of the pump is also damaged so that the entire pump must be replaced.

The present invention is directed to eliminating the disadvantages discussed above which arise in pump shafts made of ceramic materials and toward facilitating unblocking of pumps which are equipped with shafts of sintered oxide ceramics without causing damage to the shaft and/or the bearings.

SUMMARY OF THE INVENTION

In accordance with the present invention, a shaft of oxide ceramics for glandless pumps, particularly circulation pumps for heating installations, is provided with a projection upon which a metal sleeve having a bottom is mounted.

By mounting of the metal sleeve upon the oxide ceramic shaft, it is possible to apply mechanical means upon the metal sleeve without causing damage to the sensitive ceramic materials of the shaft. The connection between the shaft of oxide ceramics and the metal sleeve may be effected in various ways. For example, it is possible to connect the metal sleeve by means of solder after metallizing the shaft of ceramics material.

If low loads are applied to the shaft, glue may be applied between the shaft and the metal sleeve and this will also prove to a successful approach in the construction of the shaft.

However, in accordance with an especially preferred embodiment of the invention, the metal sleeve is shrink-fitted onto the shaft.

Sintered oxide ceramics, for example, high purity sintered oxide ceramics based on aluminum oxide, have an extremely high compressive strength although the tensile strength thereof is significantly lower. Accordingly, by shrink-fitting a metal sleeve onto a shaft of sintered oxide ceramics, it is possible to obtain a rigid bond between the metal sleeve and the shaft such that this bond may withstand all of the required loads.

Another advantage resides in the fact that no additional material, such as adhesive or solder, must be applied and the connection may be effected by shrinkage of the heated metal of the metal sleeve. A further positive aspect of this approach is the fact that this shrink-fitting procedure is rather simple to accomplish. By shrink-fitting the metal sleeve, there is ensured that even when the operating temperature is too high and the coefficients of expansion of the two materials are different, a rigid connection is obtained which reaches a torque of at least 90 cm/kp. In circulation pumps for heating installations, the required torque will usually be between 50 and 70 cm/kp. Accordingly, provisions are made to ensure that the shaft may be safely unblocked.

An advantageous embodiment of the invention provides that the external diameter of the metal sleeve is made smaller than the internal diameter of the shaft. This embodiment makes it possible to pass the shaft through a bearing, so that the metal sleeve does not come into contact with the bearing and so that, on the contrary, a play will be developed between the metal sleeve and the bearing where no foreign materials may settle.

The bottom of the metal sleeve is advantageously provided with a recess which conventionally is formed in the shape of a slot so that a screwdriver may be inserted into this slot and so that the shaft may be unblocked in this manner. Of course, other embodiments are within the scope of the invention. For example, it is advantageous to provide a hexagonal bore instead of a rectangular slot so that the shaft may be unblocked by means of an Allen wrench, or the like.

The shaft proper is preferably constructed as a hollow shaft which provides the advantage that the pumping medium may be distributed through the shaft to the other side of the bearing in order to also assume the function of cooling and lubricating the other side of the bearing. Furthermore, this leads to the advantage that the pump may be ventilated through the shaft.

It is especially advantageous when the projection of the shaft is arranged outside of the bearing. Since the bearing is surrounded by the metal sleeve, there is always the danger that the sleeves will oxidize so that foreign matter will settle on the sleeve. The danger of impairing the operativeness of the bearing will not exist when foreign matter settles outside of the bearing chamber. As a result, the operativeness of the pump will not be impaired.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
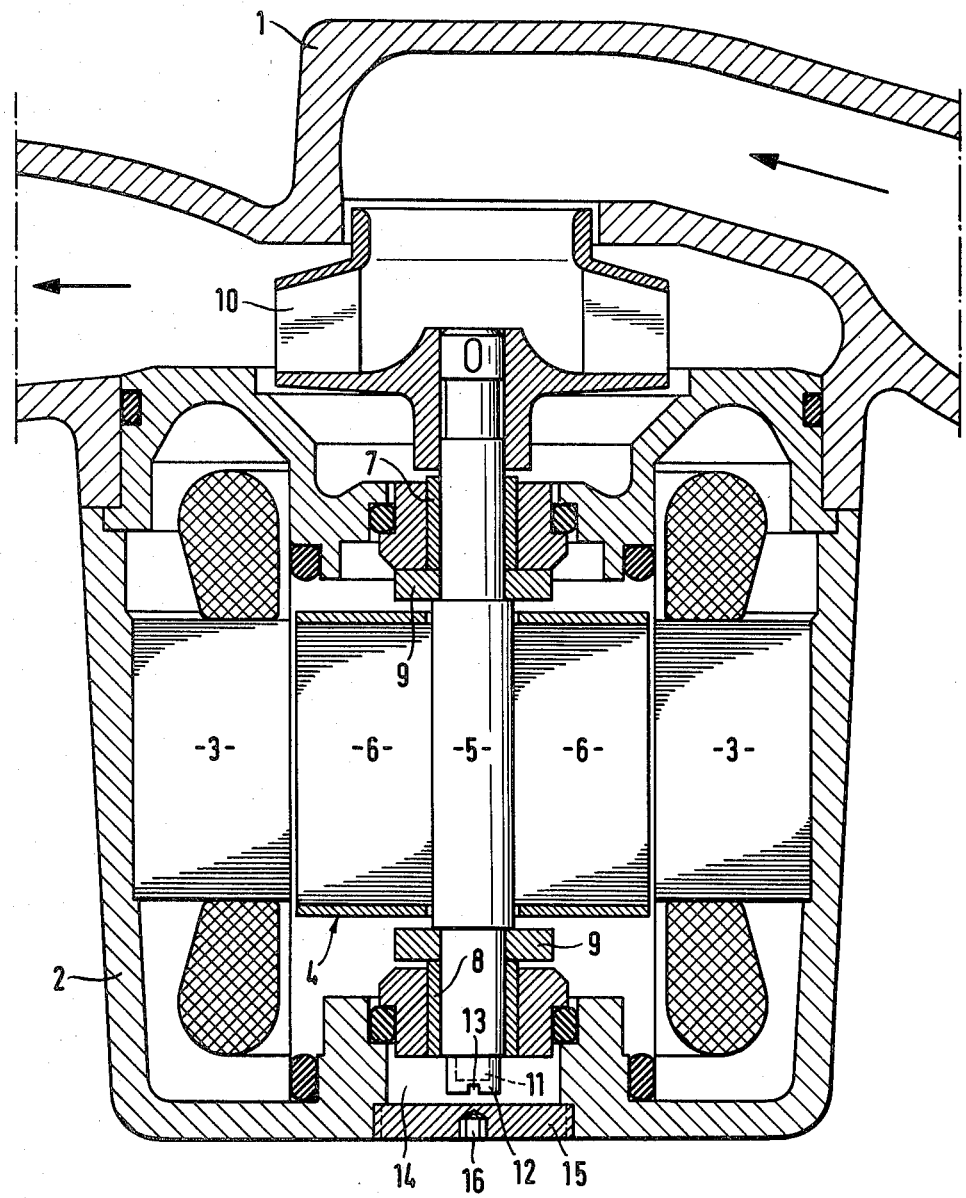
FIG. 1 is a sectional view taken through a circulation pump for a heating installation.
Figure 2:
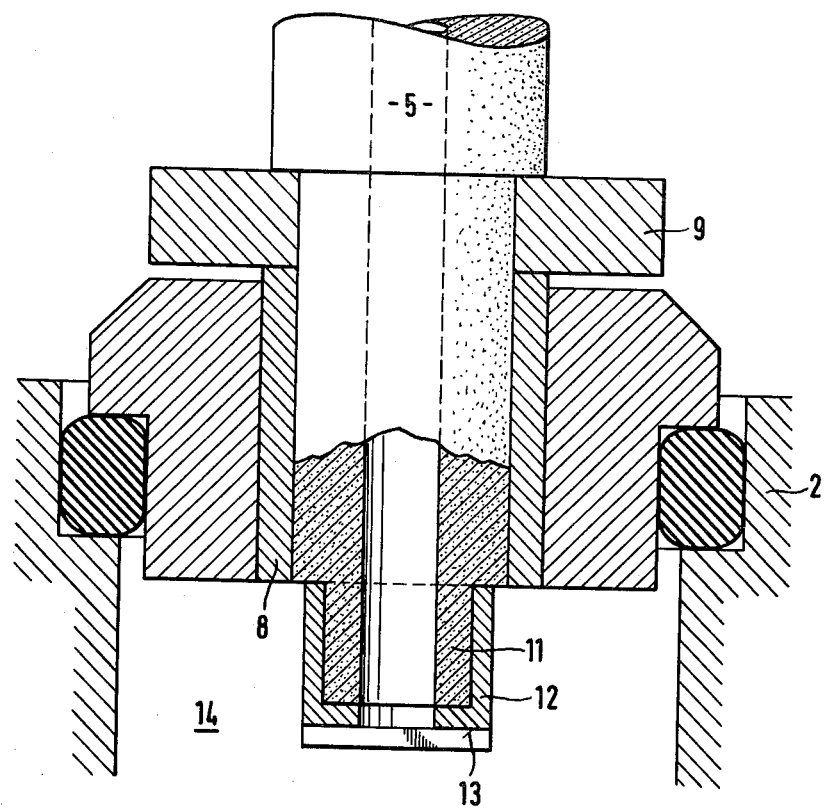
FIG. 2 is a sectional view showing in greater detail a bearing of the pump of FIG. 1.

Referring now to FIGS. 1 and 2 of the drawings wherein similar reference numerals are used to refer to like parts in both figures thereof, there is shown a motor block 2 which is flanged onto a pump housing 1. The motor block 2 contains a stator 3 and a rotor 4. The rotor 4 consists of a lamination bundle 6 and of the shaft 5. The shaft 5 essentially consists of sintered oxide ceramic materials and is supported in bearing bushings 7 and 8 which also consist of sintered oxide ceramics.

The shaft 5 is further provided with stop or thrust washers 9.

The pump assembly includes an impeller 10 and the bearing bushing 7 absorbs the radial forces generated by the impeller 10. Axial forces are distributed over the two bearing bushings 7 and 8 through the stop washers 9. A journal 11 is arranged on the shaft 5 opposite the impeller 10. The journal 11 carries a metal sleeve 12. For unblocking operation, the metal sleeve 12 has a slot 13 so that the shaft 5 may be turned by means of a screwdriver.

The bearing bushing 8 creates a hollow space 14 in the motor block 2 and the journal 11 rotates in this hollow space. The hollow space 14 is sealed by means of a cover plate 15 which is screwed into the motor block 2 and which is provided with a hexagonal recess 16 for this purpose.

While a specific embodiment of the invention has been shown and described in detail to illustrate the application of the inventive principles, it will be understood that the invention may be embodied otherwise without departing from such principles.

What is claimed is:

1. A shaft assembly for a glandless pump, particularly a circulating pump for heating installations, comprising:
   a shaft consisting essentially of oxide ceramic material and having a pair of ends;
   bearing means rotatively supporting said shaft intermediate said ends;
   a projection provided on said oxide ceramic shaft at at least one of said ends outside of said bearing means;
   a metal sleeve including a bottom part fixedly mounted on said projection of said shaft; and
   engaging means on said bottom part of said sleeve for enabling said sleeve to be engaged to effect rotation of said shaft.

2. A shaft according to claim 1 wherein said metal sleeve is shrink-fitted on said shaft.

3. A shaft according to claim 1 or 2 wherein said shaft has an external diameter and wherein said metal sleeve has an external diameter which is smaller than the external diameter of said shaft.

4. A shaft according to claim 3 wherein said engaging means on said bottom part of said metal sleeve is a recess.

* * * * *